(12) United States Patent
McIntosh et al.

(10) Patent No.: US 8,570,274 B1
(45) Date of Patent: *Oct. 29, 2013

(54) NAVIGATION DEVICE PROVIDING SENSORY FEEDBACK

(75) Inventors: Jason McIntosh, Sugar Hill, GA (US); Marc Boillot, Plantation, FL (US)

(73) Assignee: NaviSense, Plantation, FL (US)

( * ) Notice: Subject to any disclaimer, the term of this patent is extended or adjusted under 35 U.S.C. 154(b) by 398 days.

This patent is subject to a terminal disclaimer.

(21) Appl. No.: 12/900,662

(22) Filed: Oct. 8, 2010

Related U.S. Application Data

(63) Continuation-in-part of application No. 11/562,413, filed on Nov. 21, 2006, now Pat. No. 7,834,850.

(60) Provisional application No. 60/740,501, filed on Nov. 29, 2005.

(51) Int. Cl.
*G09G 5/00* (2006.01)

(52) U.S. Cl.
USPC .......................................... 345/158; 345/173

(58) Field of Classification Search
USPC ...................... 345/156–184; 715/863; 200/52
See application file for complete search history.

(56) References Cited

U.S. PATENT DOCUMENTS

| | | | |
|---|---|---|---|
| 6,130,663 A * | 10/2000 | Null | 345/158 |
| 6,669,635 B2 | 12/2003 | Kessman et al. | |
| 7,092,109 B2 * | 8/2006 | Satoh et al. | 356/620 |
| 7,302,288 B1 | 11/2007 | Schellenberg | |
| 7,643,867 B2 | 1/2010 | Solar et al. | |
| 7,750,891 B2 | 7/2010 | Stephanick et al. | |
| 7,768,498 B2 | 8/2010 | Wey | |
| 2005/0088416 A1* | 4/2005 | Hollingsworth | 345/173 |
| 2006/0161871 A1* | 7/2006 | Hotelling et al. | 715/863 |
| 2009/0215534 A1 | 8/2009 | Wilson et al. | |
| 2010/0201808 A1 | 8/2010 | Hsu | |
| 2010/0210939 A1 | 8/2010 | Hartmann et al. | |
| 2010/0249817 A1 | 9/2010 | Mark | |

* cited by examiner

*Primary Examiner* — Quan-Zhen Wang
*Assistant Examiner* — Yuk Chow

(57) ABSTRACT

A device and method is provided for sensory feedback control during touchless navigation of a user interface. The navigation system permits touchless user interface control via a wand pointing device and a receiver device. The wand is used to identify points of interest in three-dimensional space via a wand tip. The wand tip does not contain any electronics or sensors and permits precise access measurements. The wand can also be affixed to objects to track their movement and orientation within proximity of the receiver. In one arrangement, the sensory feedback provides a visual indication of the wand's location and orientation through the user interface. Other embodiments are disclosed.

20 Claims, 4 Drawing Sheets

RXs 221-223
AMP 232
PROCESSOR 233
BATTERY 234
COMMUNICATIONS 235
ACCELEROMETER 236
USER INTERFACE 237
MEMORY 238
WIRELESS I/O 239
ATTACHMENT 240
PHOTO DIODE 241
INDICATOR 224
TIMER 228

TXs 201-203
AMP 213
CONTROLLER 214
BATTERY 215
COMMUNICATIONS 216
ACCELEROMETER 217
USER INTERFACE 218
TIP SENSOR 219
BASE ATTACHMENT 205
MEMORY 208
IR TRANSMITTER 209

TRANSMIT TIMING, SEQUENCE AND PATTERN

NAVIGATION DEVICE PROVIDING SENSORY FEEDBACK

CROSS-REFERENCE TO RELATED APPLICATION

This application is a Continuation-In-Part of U.S. patent application Ser. No. 11/562,413 filed on Nov. 21, 2006 claiming the priority benefit of U.S. Provisional Patent Application No. 60/740,501 filed on Nov. 29, 2005, the entire contents of which are hereby incorporated by reference.

BACKGROUND

1. Field

The present embodiments of the invention generally relate to the field of user interfaces, and more particularly to input pointing devices.

2. Introduction

Navigation systems and other sensing technologies are generally coupled to a display. Interaction with the display can occur via mouse, keyboard or touch screen. There are cases however when the display or its peripheral devices are not directly accessible and a touchless interaction is preferable.

DETAILED DESCRIPTION

Figure 1A:
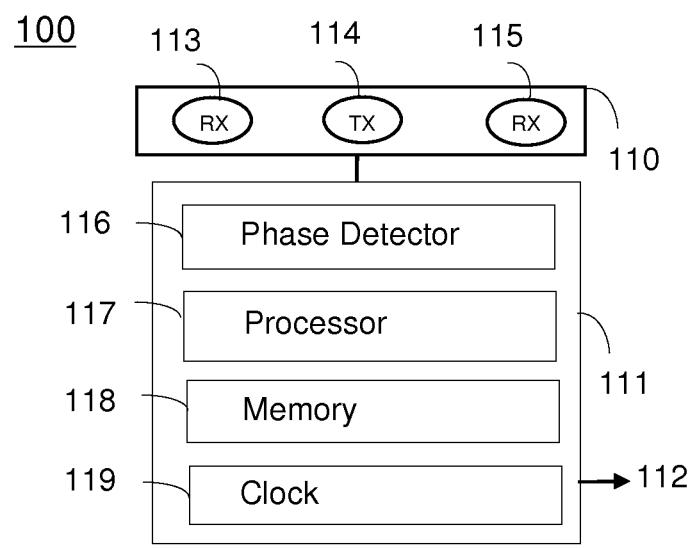
FIG. 1A is a sensing device in accordance with one embodiment.

While the specification concludes with claims defining the features of the invention that are regarded as novel, it is believed that the invention will be better understood from a consideration of the following description in conjunction with the drawing figures, in which like reference numerals are carried forward.

Broadly stated, a device and method is disclosed for providing sensory feedback during touchless navigation of a user interface. The navigation system herein permits touchless user interface control via a wand pointing device and a receiver device. The wand is used to identify points of interest in three-dimensional space via a wand tip. The wand tip does not require any electronics or sensors and permits pinpoint access. The wand can also be affixed to an object to track its movement and orientation within proximity of the receiver. The sensory feedback can include a visual indication of the wand's location and orientation through the user interface.

Referring to FIG. 1A, an ultrasonic device 100 is shown. The ultrasonic device 100 includes a sensing unit 110 for creating an ultrasonic sensing space, and a controller 111 for operating the sensing unit 110. The ultrasonic device 100 detects movement and location of an object in the ultrasonic sensing space. A display can be coupled through I/O 112 to the ultrasonic device 100 for showing the movement or position of the object. The sensing unit 110 can include one or more transmitter 114 sensors and one or more receiver 115-116 sensors. One example of an ultrasonic device in such embodiment is disclosed in parent application U.S. patent application Ser. No. 11/562,413 entitled "Method and System for Providing Sensory Feedback" filed Nov. 21, 2006 the entire contents of which are hereby incorporated by reference.

As one example, the sensing element can be ultrasonic for transmitting and receiving ultrasonic signals. The sensors can be an array (e.g., line, rows, cols, etc.) or other arranged pattern (e.g., cross, triangle, circle, etc.) of sensing elements. In another arrangement, the sensing element can be an array of microphones and speakers for transmitting and receiving ultrasonic and audio signals. In one arrangement, the ultrasonic device 100 can employ pulse-echo detection of reflected ultrasonic signals for determining its orientation with respect to an object within its proximity and for touchless sensing.

The ultrasonic device 100 can include, but is not limited to, a phase detector 116, a processor 117, a memory 118, and a clock 119. The sensing unit 110 can be integrated within the ultrasonic device 100, or apart from it. The phase detector 116 can be cooperatively connected to the sensing unit 110 for processing transmitted and received ultrasonic signals. The phase detector 116 can be coupled to the processor 117 for calculating phase differences among multiple receive signals. The processor 117 can process these phase differences for estimating a movement the object in the sensing space 101.

Figure 1B:
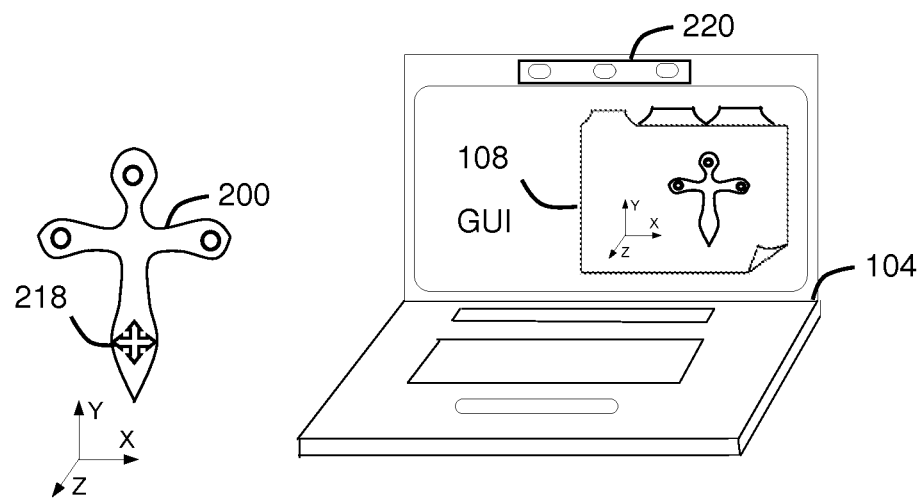
FIG. 1B is a reconfiguration of the sensing device coupled to a host system in accordance with one embodiment.

In one arrangement, as shown in FIG. 1B the ultrasonic device 100 can be partitioned out to an ultrasonic wand 200 and an ultrasonic receiver 220 to separate the transmit 114 operations from the receive 115 operation. The wand 200 and receiver 220 together create a three-dimensional sensory space. In this configuration, a navigation system is provided for positional measurement via ultrasonic tracking between wand and receiver. One example of creating a three-dimensional sensory space and tracking object motion via ultrasonic sensing as applicable to the wand 200 and receiver 200 configuration is disclosed in U.S. patent application Ser. No. 11/566,148 entitled "Method and System for Mapping Virtual Coordinates" filed Dec. 1, 2006 the entire contents of which are hereby incorporated by reference. The receiver 220 can precisely track the wand 200, or wands if more than one is present, and report the wand position on the graphical user interface (GUI) 108 of the laptop (host system) 104. The wand 200 provides additional user interface control via a soft key 218. The receiver 220 is integrated within a laptop display for portability as the illustration shows, although, the receiver 220 can be a self-powered standalone device to communicate with the laptop 104 via wireless communication.

An exemplary method for providing sensory feedback by way of the navigation device 100 is provided according to one embodiment. The method can contain more than the steps disclosed below and is not limited to the steps shown. At a first step, the receiver 220 monitors a location and movement of the wand in the three-dimensional sensory space. As one example, a user can hold the wand 200 to register points on, or trace a contour of, an object. It tracks a precise location of the wand 200 tip on the object and/or in the air. The location is a point, for example, an <x,y,z> coordinate of the wand tip. The movement describes a time trajectory of points and includes the wand's orientation and position. The orientation describes the tilt or twist. The position is relative to the receiver 220.

The user can press the button 218 to register a point(s) of interest, for example, holding the button 218 down when registering a location of a point, or tracing the contour of the object (points creating a curve or line).

At a second step, the receiver 220 provides sensory feedback according to the wand's location and movement. The wand 200 and receiver 220 directly communicate with one another via a wired or wireless connection. The receiver 220 communicates via a wireless connection to the laptop 104 which can include the display. The laptop 104 can be a computer, mobile device or a cell phone or combination thereof; it is not limited to these. The laptop 104 hosts the Graphical User Interface (GUI) 108. It can be a local application resident on the laptop 104, an on-line application provided by an Internet Service Provider or cloud computing system, a cable or internet-TV provider, or a down-loadable application over the air (e.g., cellular infrastructure, telecom, etc.). The sensory feedback can be visual feedback through the GUI 108 or other visual mechanisms (e.g., LED), auditory feedback (e.g., sound), or haptic feedback (e.g., vibration). As an example, the GUI 108 presents a virtual environment that can include a virtual wand showing its location and orientation relative to the receiver 220. The GUI 108 can report the wand's location and any registered points of interest in a virtual environment on the display.

Figure 2:
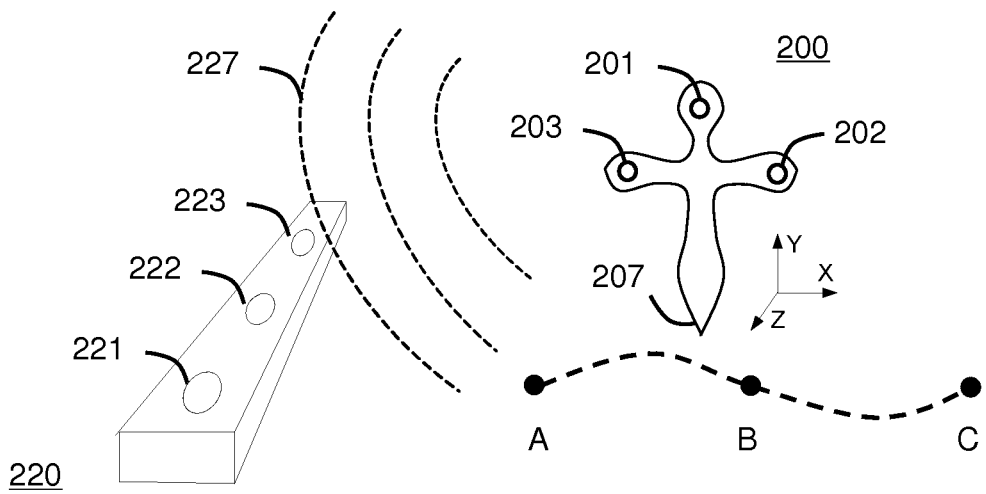
FIG. 2 is a receiver and wand of the navigation device in accordance with one embodiment.

FIG. 2 shows one exemplary embodiment of the wand 200 and the receiver 220 for providing sensory feedback with associated modules and components. Not all the components shown are required; fewer components can be used depending on required functionality, for instance, whether the wand is used for isolated point registration, continuous wand tracking without user input or local illumination, or as integrated devices (e.g., laptop display). The wand 200 is a hand-held device with a size dimension of approximately 10 cm in width, 2 cm depth, and an extendable length from 15 cm to 20 cm. The receiver 220 has size dimensions of approximately 2 cm width, 2 cm depth, and a length of 10 cm to 20 cm. Neither device is however limited to these dimensions and can be altered to support various functions (e.g, hand-held, coupled to object). The current size permits touchless tracking of the wand tip with sub millimeter spatial accuracy up to approximately 2 m in distance.

As indicated above, the wand 200 can register points of interest (see points A, B, C), for example, along a contour of an object or surface, which can be presented in a user interface (see laptop 104 FIG. 1). As will be discussed ahead, the wand 200 and receiver 220 can communicate via ultrasonic, infrared and electromagnetic sensing to determine their relative location and orientation to one another. Other embodiments incorporating accelerometers provide further positional information as will be discussed ahead.

The wand 200 includes sensors 201-203 and a wand tip 207. The sensors can be ultrasonic transducers, Micro Electro Mechanical Element (MEMS) microphones, electromagnets, optical elements (e.g., infrared, laser), metallic objects or other transducers for converting or conveying a physical movement to an electric signal such as a voltage or current. They may be active elements in that they are self powered to transmit signals, or passive elements in that they are reflective or exhibit detectable magnetic properties.

In a preferred embodiment, the wand 200 comprises three ultrasonic transmitters 201-203 for each transmitting ultrasonic signals through the air, an electronic circuit (or controller) 214 for generating driver signals to the three ultrasonic transmitters 201-203 for generating the ultrasonic signals, an user interface 218 (e.g., button) that receives user input for performing short range positional measurement and alignment determination, a communications port 216 for relaying the user input and receiving timing information to control the electronic circuit 214, and a battery 215 for powering the electronic circuit 215 and associated electronics on the wand 200. The wand 200 may contain more or less than the number of components shown; certain component functionalities may be shared as integrated devices.

Additional transmitter sensors can be included to provide an over-determined system for three-dimensional sensing. As one example, each ultrasonic transducer can perform separate transmit and receive functions. One such example of an ultrasonic sensor is disclosed in U.S. patent application Ser. No. 11/562,410 filed Nov. 13, 2006 the entire contents of which are hereby incorporated by reference. The ultrasonic sensors can transmit pulse shaped waveforms in accordance with physical characteristics of a customized transducer for constructing and shaping waveforms.

The wand tip 207 identifies points of interest on a structure, for example, an assembly, object, instrument or jig in three-dimensional space but is not limited to these. The tip does not require sensors since its spatial location in three-dimensional space is established by the three ultrasonic transmitters 201-203 arranged at the cross ends. However, a sensor element can be integrated on the tip 207 to provide ultrasound capabilities (e.g., structure boundaries, depth, etc.) or contact based sensing. In such case, the tip 207 can be touch sensitive to registers points responsive to a physical action, for example, touching the tip to an anatomical or structural location. The tip can comprise a mechanical or actuated spring assembly for such purpose. In another arrangement it includes a capacitive touch tip or electrostatic assembly for registering touch. The wand tip 207 can include interchangeable, detachable or multi-headed stylus tips for permitting the wand tip to identify anatomical features while the transmitters 201-203 remain in line-of-sight with the receiver 220 (see FIG. 1). These stylus tips may be right angled, curved, or otherwise contoured in fashion of a pick to point to difficult to touch locations. This permits the wand to be held in the hand to identify via the tip 207, points of interest such as (anatomical) features on the structure, bone or jig.

The user interface 218 can include one or more buttons to permit handheld operation and use (e.g., on/off/reset button) and illumination elements to provide visual feedback. In one arrangement, a 5-state navigation press button 209 can communicate directives to further control or complement the user interface. It can be ergonomically located on a side of the wand to permit single handed use. The wand 200 may further include a haptic module with the user interface 218. As an example, the haptic module may change (increase/decrease) vibration to signal improper or proper operation. The wand 200 includes material coverings for the transmitters 201-202 that are transparent to sound (e.g., ultrasound) and light (e.g., infrared) yet impervious to biological material such as water, blood or tissue. In one arrangement, a clear plastic membrane (or mesh) is stretched taught; it can vibrate under resonance with a transmitted frequency. The battery 215 can be charged via wireless energy charging (e.g., magnetic induction coils and super capacitors).

The wand 200 can include a base attachment mechanism 205 for coupling to a structure, object or a jig. As one example, the mechanism can be a magnetic assembly with a fixed insert (e.g., square post head) to permit temporary detachment. As another example, it can be a magnetic ball and joint socket with latched increments. As yet another example, it can be a screw post o pin to an screw. Other embodiments may permit sliding, translation, rotation, angling and lock-in attachment and release, and coupling to standard jigs by way of existing notches, ridges or holes.

The wand 200 can further include an amplifier 213 and the accelerometer 217. The amplifier enhances the signal to noise ratio of transmitted or received signals. The accelerometer 217 identifies 3 and 6 axis tilt during motion and while stationary. The communications module 216 may include components (e.g., synchronous clocks, radio frequency 'RF' pulses, infrared 'IR' pulses, optical/acoustic pulse) for signaling to the receiver 220 (FIG. 2B). The controller 214, can include a counter, a clock, or other analog or digital logic for controlling transmit and receive synchronization and sequencing of the sensor signals, accelerometer information, and other component data or status. The battery 215 powers the respective circuit logic and components. The infrared transmitter 209 pulses an infrared timing signal that can be synchronized with the transmitting of the ultrasonic signals (to the receiver).

The controller 214 can utilize computing technologies such as a microprocessor (uP) and/or digital signal processor (DSP) with associated storage memory 108 such a Flash, ROM, RAM, SRAM, DRAM or other like technologies for controlling operations of the aforementioned components of the device. The instructions may also reside, completely or at least partially, within other memory, and/or a processor during execution thereof by another processor or computer system. An Input/Output port permits portable exchange of information or data for example by way of Universal Serial Bus (USB). The electronic circuitry of the controller can comprise one or more Application Specific Integrated Circuit (ASIC) chips or Field Programmable Gate Arrays (FPGAs), for example, specific to a core signal processing algorithm. The controller can be an embedded platform running one or more modules of an operating system (OS). In one arrangement, the storage memory may store one or more sets of instructions (e.g., software) embodying any one or more of the methodologies or functions described herein.

The receiver 220 comprises a processor 233 for generating timing information, registering a pointing location of the wand 200 responsive to the user input, and determining short range positional measurement and alignment from three or more pointing locations of the wand 200 with respect to the receiver 220. It includes a communications interface 235 for transmitting the timing information to the wand 200 that in response transmits the first, second and third ultrasonic signals. The ultrasonic signals can be pulse shaped signals generated from a combination of amplitude modulation, frequency modulation, and phase modulation. Three microphones 221-223 each receive the first, second and third pulse shaped signals transmitted through the air. The receiver 220 shape can be configured from lineal as shown, or in more compact arrangements, such as a triangle shape. One example of a device for three-dimensional sensing is disclosed in U.S. patent application Ser. No. 11/683,410 entitled "Method and Device for Three-Dimensional Sensing" filed Mar. 7, 2007 the entire contents of which are hereby incorporated by reference. The memory 238 stores the first, second and third ultrasonics signals and can produce a history of ultrasonic signals or processed signals. It can also store wand tip positions, for example, responsive to a user pressing the button to register a location. The wireless communication interface (Input/Output) 239 wirelessly conveys the positional information and the short range alignment of the three or more pointing locations to a remote system. The remote system can be a computer, laptop or mobile device that displays the positional information and alignment information in real-time as described ahead. The battery powers the processor 233 and associated electronics on the receiver 220. The receiver 200 may contain more or less than the number of components shown; certain component functionalities may be shared or therein integrated.

Additional ultrasonic sensors can be included to provide an over-determined system for three-dimensional sensing. The ultrasonic sensors can be MEMS microphones, receivers, ultrasonic transmitters or combination thereof. As one example, each ultrasonic transducer can perform separate transmit and receive functions. One such example of an ultrasonic sensor is disclosed in U.S. patent application Ser. No. 11/562,410 filed Nov. 13, 2006 the entire contents of which are hereby incorporated by reference. The receiver 220 can also include an attachment mechanism 240 for coupling to bone or a jig. As one example, the mechanism 240 can be a magnetic assembly with a fixed insert (e.g., square post head) to permit temporary detachment. As another example, it can be a magnetic ball and joint socket with latched increments.

The receiver 220 can further include an amplifier 232, the communications module 235, an accelerometer, and processor 233. The processor 233 can host software program modules such as a pulse shaper, a phase detector, a signal compressor, and other digital signal processor code utilities and packages. The amplifier 232 enhances the signal to noise of transmitted or received signals. The processor 233 can include a controller, counter, a clock, and other analog or digital logic for controlling transmit and receive synchronization and sequencing of the sensor signals, accelerometer information, and other component data or status. The accelerometer 236 identifies axial tilt (e.g., 3/6 axis) during motion and while stationary. The battery 234 powers the respective circuit logic and components. The receiver includes a photo diode 241 for detecting the infrared signal and establishing a transmit time of the ultrasonic signals to permit wireless infrared communication with the wand.

The communications module 235 can include components (e.g., synchronous clocks, radio frequency 'RF' pulses, infrared 'IR' pulses, optical/acoustic pulse) for local signaling (to wand 102). It can also include network and data components (e.g., Bluetooth, ZigBee, Wi-Fi, GPSK, FSK, USB, RS232, IR, etc.) for wireless communications with a remote device (e.g., laptop, computer, etc.). Although external communication via the network and data components is herein contemplate, it should be noted that the receiver 220 can include a user interface 237 to permit standalone operation. As one example, it can include 3 LED lights 224 to show three or more wand tip pointing location alignment status. The user interface 237 may also include a touch screen or other interface display with its own GUI for reporting positional information and alignment.

The processor 233 can utilize computing technologies such as a microprocessor (uP) and/or digital signal processor (DSP) with associated storage memory 108 such a Flash, ROM, RAM, SRAM, DRAM or other like technologies for controlling operations of the aforementioned components of the terminal device. The instructions may also reside, completely or at least partially, within other memory, and/or a processor during execution thereof by another processor or computer system. An Input/Output port permits portable exchange of information or data for example by way of Universal Serial Bus (USB). The electronic circuitry of the controller can comprise one or more Application Specific Integrated Circuit (ASIC) chips or Field Programmable Gate Arrays (FPGAs), for example, specific to a core signal processing algorithm or control logic. The processor can be an embedded platform running one or more modules of an operating system (OS). In one arrangement, the storage memory 238 may store one or more sets of instructions (e.g., software) embodying any one or more of the methodologies or functions described herein.

In a first arrangement, the receiver 220 is wired via a tethered electrical connection (e.g., wire) to the wand 200. That is, the communications port of the wand 200 is physically wired to the communications interface of the receiver 220 for receiving timing information. The timing information from the receiver 220 tells the wand 200 when to transmit and includes optional parameters that can be applied to pulse shaping. The processor on the receiver 220 employs this timing information to establish Time of Flight measurements in the case of ultrasonic signaling with respect to a reference time base.

In a second arrangement, the receiver 220 is communicatively coupled to the wand 200 via a wireless signaling connection. An infrared transmitter 209 on the wand 200 transmits an infrared timing signal with each transmitted pulse shaped signal. It pulses an infrared timing signal that is synchronized with the transmitting of the ultrasonic signals to the receiver. The receiver 302 can include a photo diode 241 for determining when the infrared timing signal is received. In this case the communications port of the wand 200 is wirelessly coupled to the communications interface of the receiver 220 by way of the infrared transmitter and the photo diode for relaying the timing information to within microsecond accuracy (~1 mm resolution). The processor on the receiver 220 employs this infrared timing information to establish the first, second and third Time of Flight measurements with respect to a reference transmit time.

Figure 3A:
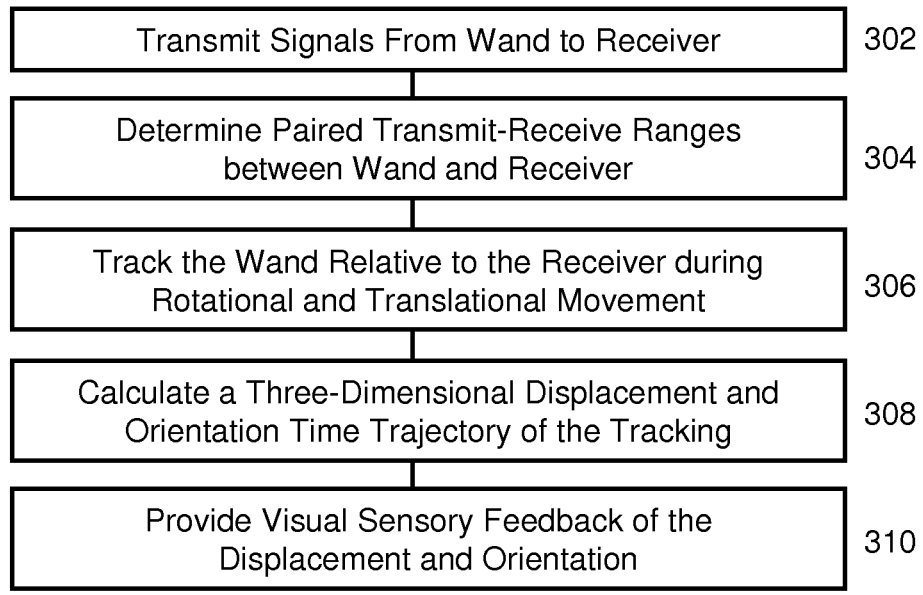
FIG. 3A is a method for tracking wand movement and providing visual feedback in accordance with one embodiment.

Referring to FIG. 3A an exemplary method 300 for determining wand position via ultrasonic sensing and providing sensory feedback therewith is shown. In the current embodiment, it is based on an analysis of received ultrasonic waveforms though other positional measurements means are herein contemplated such as electromagnetic and optical. When describing the method 300, reference will be made to FIGS. 1, 2, 3B to 3D although the method 300 can be practiced in any other suitable system or device. Moreover, the steps of the method 300 are not limited to the particular order in which they are presented in FIG. 3. The method can also have a greater number of steps or a fewer number of steps than those shown in FIG. 3.

At step 302, the wand 200 transmits ultrasonic signals to the receiver 220. It can do this independently, or by directive, from the receiver 220. Briefly, FIG. 3A is one exemplary illustration of pulse signaling between the wand 200 and receiver 220 for analyzing a positional location of the wand 200 from directed ultrasonic signals. Notably, FIG. 3A only shows one transmitter with two corresponding receivers (microphones), although the wand 200 as shown in FIG. 2 includes 3 transmitters, and the receiver 220 includes 3 microphones; the same principles of pulse signaling for transmit-receiver operations can apply.

At a first location 1, the wand 200 transmits one of a plurality of ultrasonic pulses (TX1) from each of the transmitters 201-203. The pulse transmission can be staggered in time, for example, if same pulse frequencies are used, or coincident in time, for example, if different pulse frequencies are used. The receiver 220 determines a Time of Flight measurement (TOF) by estimating the amount of time expiring between when the signal (TX1) was transmitted by each transmitter and when it was received at each microphone. It also estimates a phase difference that provides precise accuracy of the relative displacement measured by each transmit-receive sensor pair. The receiver 220 includes additional processing logic such as threshold detectors, and tracking circuits, for estimating the arrival time of the TOF and phase differences. As will be discussed ahead, the receiver 220 converts the TOFs and phase differentials from the microphones to a three-dimensional coordinate value for each wand location monitored. The receiver 220 records transmission times TX2 for monitoring the wand movement at different locations to achieve smooth motion. This also permits for the detection of wand gestures. Examples of detecting such gestures and patterns are described in U.S. patent application Ser. No. 11/566,137 the entire contents of which are hereby incorporated by reference.

Three or more transmitters on the wand 200 perform a sequence of ultrasonic waveform transmissions that occur simultaneously, staggered in time (e.g., delayed transmit) or a combination thereof. Each transmitter can transmit at a same frequency (e.g., 40 KHz) and at different frequencies (e.g., 40, 64, 80, 120 KHz). Different fundamental frequency transmit timing patterns are based on predetermined interference patterns—due to constructive and deconstructive interference of the ultrasonic energy waves. Accordingly, the transmit duration (amount of time the transmitter is vibrating) can be set as a function of the frequencies and timing sequence. With the speed of sound at 343 m/s, the TOF measurement establishes the distance from each transmitter on the wand 200 to the corresponding receivers (microphones) on the receiver 220 during the movement.

With regard to the components of FIG. 2, the transmitter 201 receives from the controller 214 a driver signal that describes the transmit shape to be transmitted. As one example the shape can be a square wave that causes a transducer of the transmitter 201 to resonate. In another arrangement, the driver signal can be a frequency modulated or amplitude modulated driver signal provided by the controller 214 to intentionally resonate the transducer in a prescribed manner. One such example of pulse shaping is taught in U.S. Pat. No. 7,414,705 entitled "Method and System for Range Measurement" the entire contents of which are hereby incorporated by reference. Alternatively, timing information provided to the controller 214 from the receiver 302 can include pulse shape information or pulse shape parameters in real-time; that is, the receiver 220 directs the wand 200 to transmit ultrasonic pulse signals with a specified shape and at a specified time. The shaping comprises generating an amplitude modulated region, frequency modulated region, constant frequency region, phase modulated region, a chirp region, or a combination thereof.

At step 304, the receiver 220 determines paired transmit-receive ranges from the wand 200 by a weighted combination of time of flight (TOF) and phase differentials of the ultrasonic signals captured and processed at the microphones 221-223 of the receiver 200. The weighting can be a linear or non-linear function of the distance and orientation between the wand 200 and receiver 220. The direct time of flight and phase differentials are weighted according to a relative location of the wand 200 with respect to a location of the receiver 220, for example, in accordance with an acoustic map. Pseudocode for an algorithmic weighting is shown and described below:

$$x = F_X(L_0, L_1, L_2)$$

$$y = F_Y(L_0, L_1, L_2)$$

$$z = F_Z(L_0, L_1, L_2)$$

where coordinates <x,y,z> are each a respective function ($F_X$, $F_Y$ or $F_Z$) of a respective measurement parameter ($L_0$, $L_1$, $L_2$) such as a Time of Flight measurement (e.g., Length of time) between a transmitted (TX) waveform and a received (RX) waveform. The change in position of a single TX, for example of 3 or more TXs, can be determined from partial differentials:

$$dx_1 = \left(\frac{dF_x}{dL_0}\right) \bullet dL_0 + \left(\frac{dF_x}{dL_1}\right) \bullet dL_1 + \left(\frac{dF_x}{dL_2}\right) \bullet dL_2$$

$$dy_1 = \left(\frac{dF_y}{dL_0}\right) \bullet dL_0 + \left(\frac{dF_y}{dL_1}\right) \bullet dL_1 + \left(\frac{dF_y}{dL_2}\right) \bullet dL_2$$

$$dz_2 = \left(\frac{dF_z}{dL_0}\right) \bullet dL_0 + \left(\frac{dF_z}{dL_1}\right) \bullet dL_1 + \left(\frac{dF_z}{dL_2}\right) \bullet dL_2$$

where $$\left(\frac{dF}{dL}\right)$$

for each ($F_X$, $F_Y$ or $F_Z$) and respective measurement parameter ($L_0$, $L_1$, $L_2$) is the change in the overall measured Time of Flight for each TX/RX pair (e.g., parametric: $L_0(t)-L_0(t-1)$), and the weighting term ·dL for each of ($L_0$, $L_1$, $L_2$) is the measured phase differential between successively measured received waveforms at the receiver RX. Weighting is a scalar multiply.

Each TX is represented by the subscript in the partial difference, so TX1 has coordinate deltas of <$dx_1$,$dy_1$,$dz_1$> along the X, Y and Z directions as calculated above, TX 2 has <$dx_2$,$dy_2$,$dz_2$>, TX 3 has <$dx_3$,$dy_3$,$dz_3$> and so on, up to the number of transmitters. Each of the delta coordinate is then added to a previous location estimate to obtain the updated location as below:

TX1 coordinate<$x_1,y_1,z_1$>(t)=<$x_1,y_1,z_1$>(t−n)+<$dx_1$, $dy_1,dz_1$>

TX2 coordinate<$x_2,y_2,z_2$>(t)=<$x_2,y_2,z_2$>(t−n)+<$dx_2$, $dy_2,dz_2$>

TX3 coordinate<$x_3,y_3,z_3$>(t)=<$x_3,y_3,z_3$>(t−n)+<$dx_3,dy_3,$ $dz_3$> where the parametric equation uses (t) as time and (t−n) as a previous point in time. As described ahead, the TX coordinates and differential changes in each of the TX (201-203) locations are used to calculate a rotation and translation of the wand 200 and the geometric location of the wand tip 207 (see FIG. 2), which is fixed (or predetermined for different wand tips) relative to the location of the TXs (201-203). It should also be noted that the decomposition of the location update first by way of partial differentials reduces computational complexity and associated memory requirements for real-time signal processing. This permits small program code and memory footprint for efficient real-time performance on a DSP with low-memory requirements; including size and latency.

As part of an initialization or calibration, the receiver 220 creates the acoustic map of the acoustic propagation characteristics of the ultrasonic wand transmitters at a plurality of locations in physical space in proximity to the ultrasonic receiver. This further enhances tracking accuracy as the receiver 220 is weighting according to a calibrated location of the wand 200 with respect to a known location of the receiver 220. During operation, the receiver then weights the time of flight and the phase differential measurements of the ultrasonic signals according to the equations above based on the acoustic map, where the acoustic map identifies transmission parameters of temperature, attenuation, frequency and phase. One example of touchless movement and range calibration enabled herein is disclosed in U.S. patent application Ser. No. 11/850,634; the entire contents of which are hereby incorporated by reference. A distinguishing advantage of ultrasonic sensing is that the spherical surface of acoustic wave propagation allows for different time measurements. In certain configurations, this allows three transmitters to be coplanar yet provide three-dimensional sensing.

The receiver 220 initially estimates a general location of the wand 200 to produce an estimated location from the sequence of ultrasonic Time of Flight (TOF) measurements from ultrasonic signals transmitted from the wand 200 to the receiver 220. The receiver 200 refines this estimated location via a linear weighting with the phase differentials. The estimated location is a point in three-dimensional (3D) space (e.g., <x,y,z>). Furthermore, the wand 200 can adjust the sequence pattern as a function of the movement detected by the accelerometer, for example, when it is moving or held still. The time of flight represents the flight time, that accounting for processing delays, is calculated between when an ultrasonic signal is transmitted from the wand 200 to when it is received (arrives) at the receiver 220. Threshold and logic gates in hardware and software can determine when it is received (detected). One such example of applying weighted differences in an integrated transmit and receive device is taught in U.S. patent application Ser. No. 11/562,404 entitled "Method and System for Object Control", the entire contents of which are hereby incorporated by reference FIG. 3C shows an exemplary illustration of time domain signals for showing how time of flights and phase differences can be calculated there from. Two ultrasonic waveforms are shown: waveform 389 is a currently received waveform at a microphone, and waveform 388 is a previously received waveform at the same microphone or a previously received waveform at a different microphone. In practice the signals of each subplot can lag or lead each other based on the location of the wand and the positioning of the sensors. The receiver 220 processes the two waveforms and determines a phase difference 351 (d1) there between. As one example, the processor 233 calculates the phase difference from an analysis of the zero crossings (or peaks) for the first signal 377 and the second signal 379. The TOF is measured for 388 and 389 by estimating the arrival time of the waveform. The processor 233 determines when the waveform reaches a certain threshold, marked by the dotted line 341. The point at which the signal amplitude crosses the threshold marks the time of flight. For example, the arrow 352 illustrates the TOF for 388. The processor 233 can also apply a zero-crossing gate within the region of threshold to estimate the TOF. The processor 233 calculates the dTOF from the time difference between zero-crossings within the threshold region denoted by 375 and 376. The processor can also apply selective peak picking approaches and/or a Fast Fourier Transform (FFT) to get a more representative time estimate of the phase difference between the waveforms.

Returning back to FIG. 3A, at step 306, the receiver 220 tracks the wand 200 by way of, and relative to the receiver 220. To resolve the position the receiver 220 converts the time of flight and set of phase differentials calculated from each of the received ultrasonic signals at the three microphones 221-223 to three spatial points, and transforms the three spatial points to X, Y and Z rotations around the tip 207. This establishes the orientation of the wand 200. The receiver 220 determines the rotations with respect to its local coordinate system (at the origin); that is, local to the device. The receiver 220 thereafter applies a series of translations and rotations to map the wand's 200 coordinate system to its own local coordinate system. This transformation establishes an orientation of the wand 200 and positional location of the tip relative to the receiver 220. The mapping includes i) the wand 200 dimensions (e.g., 10×3×10 cm <w,l,h>) and component layout for the local coordinates of the transmitters and the tip 207 that are predetermined, and ii) the receiver 220 dimensions (e.g., 6×2×8 cm, <w,l,h>) and component layout for the local coordinates of the microphones and its coordinate origin that are predetermined.

The positional location is where the tip 207 is located in three-dimensional space with respect to an orientation of the wand 200. The positional location can be represented in Cartesian coordinates or polar coordinates. It can be the same point in three-dimensional space even though the wand orientation (e.g., tilt, rotation). The positional location identifies the tip 207 location relative to the second receiver 220 and the spatial coordinates of the three or more transmitters 201-203 relative to the coordinate system of the second receiver 220. It can be reported via sensory feedback, graphical or text display and/or audibly. One such example of sensory feedback via ultrasonic sensing and its principles of operation is taught in the parent U.S. patent application Ser. No. 11/562,413 entitled "Method and System for Sensory Feedback" the entire contents of which are hereby incorporated by reference.

In one embodiment, the wand 200 and receiver 220 communicate location information by combination of ultrasonic pulsing and optical sequencing. This permits the receiver 220 to synchronize a transmit pulsing of the ultrasonic signals from the wand 200 and incorporate timing of the synchronized transmit pulsing to measure its location and orientation. The wand 200 emits high frequency sound pulses (e.g., 40-120 KHz) transmitted by each of the respective transmitters 201-203 that arrive at the microphones 221-223 of the receiver 220 at different times. The timing information between each of the received pulses and the time length of sound travel is used to determine the location of each of the transmitters 201-203 on the wand 200 and then the location of the wand tip from the geometry of the wand with respect to the transmitter locations. Three sensors along with this timing information are used to establish three-dimensional coordinates of the wand 200. Sampling intervals on the order of 160 to 200 samples (16-bit) per second per transmitter are sufficient for real-time analysis, though higher rates are achievable. In another unique arrangement, only two sensors are used on the wand to achieve a narrower physical profile for three-dimensional location and positioning based on spherical propagation characteristics of the sound waves.

Figure 3B:
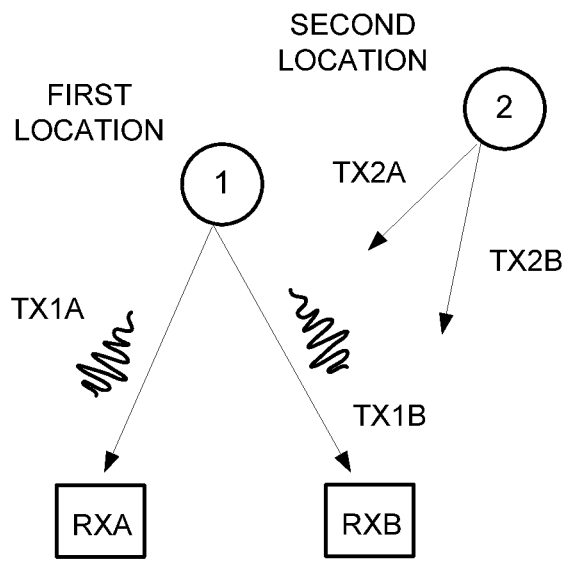
FIG. 3B is an exemplary illustration for a pulse signal configuration in accordance with one embodiment.
Figure 3C:
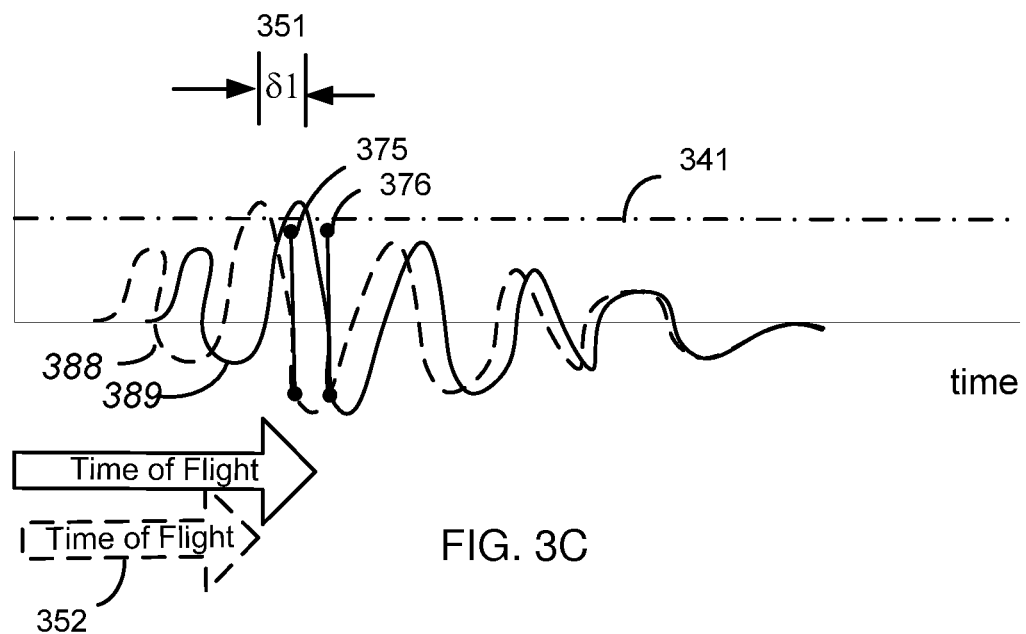
FIG. 3C is an exemplary illustration of time domain signals in accordance with one embodiment.
Figure 3D:
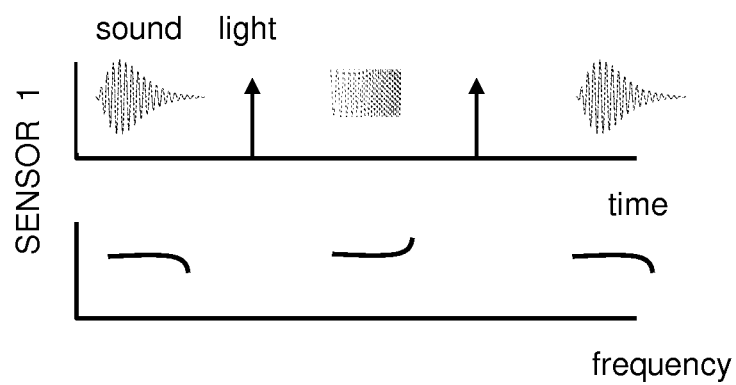
FIG. 3D is an exemplary illustration of transmit sequencing in accordance with one embodiment.

Briefly, FIG. 3D depicts an exemplary diagram for local communication and point registration between the wand 200 and the receiver 220. It illustrates transmit timing, sequence and pattern information using a combination of ultrasonic and optical signal processing according to one embodiment. The wand 200 simultaneously transmits a light signal (e.g., infrared pulse) with the ultrasonic pulse to signify sequence start of each ultrasonic pulse. The light signal is received at the receiver 220 to trigger timing of the received sound signal (e.g., ultrasonic pulse). The receiver 220 determines the time of flight of the ultrasonic pulse responsive to receiving the light signal, including any compensatory time information. For instance, a clock counts the elapsed time or is sequenced to an oscillator circuit.

The transmit characteristics of the ultrasonic pulse can change as a function of time, frequency and intensity as shown in FIG. 3B. The pulse duration, harmonic frequency content, frequency profile characteristics, phase and amplitude can all be adaptively changed during alignment measurement to maximize signal to noise ratio, distance measurement, and environmental conditions (e.g., temperature, drift, etc.). As one example, the microphone can assess noise floors and convey this information to a processor to adjust the ultrasonic pulse characteristics. As one example, each transmit sensor on the wand 200 can individually adjust its transmit amplitude and frequency to mitigate interference and/or generate selective interference patterns. The receiver 220 can process the interference patterns via pattern detection, look up tables, spectral distortion measures, or statistical signal processing approaches to refine position estimates (e.g., <x,y,z> location).

Another embodiment incorporates synchronized clocks on both the wand 200 and receiver 220. A light pulse can initiate or reset synchronization. The synchronization is timed with the ultrasonic travel time and estimated wand 200 locations. As yet another example, Radio Frequency (RF) pulsing can be used to trigger onset timing of an ultrasonic pulse. The RF pulse can be transmitted with the ultrasonic pulse to identify the start time for measuring the ultrasonic pulse travel time. The receiver 220 and the wand 200 can be calibrated prior to use to ensure proper synchronization. In one configuration, bringing the wand 200 in close proximity to the receiver 220 can perform a calibration function, reset synchronization, or adjust another user function.

Returning back to FIG. 3, at step 308, the ultrasonic receiver 220 calculates a three-dimensional displacement and orientation time trajectory of the ultrasonic wand 200 relative to the ultrasonic receiver 220 from the tracking of the wand 200 by the time of flight and phase differential measurements. The time-of-flight and phase differentials across the microphones 221-223 of the receiver 220 array are correlated to the properties of the propagation of sound in the surrounding fluid (or air) and the transmission characterisitics of the ultrasonic transmitters (201-203; sound source) to preciseely determine the location of the wand 200 relative to the microphone array of the receiver 220. By saving its coordinate information to local memory, the ultrasonic receiver 220 then creates a series of transformation matrices representing its displacement and orientation as a time trajectory.

More specifically, the receiver 220 calculates a set of phase differences between the first sequence of ultrasonic Time of Flight (TOF) measurements and the second sequence of ultrasonic Time of Flight (TOF) measurements. A phase difference for each transmit-receiver pair is calculated for the set of phase differences. One such example of detecting phase differences is taught in U.S. patent application Ser. Nos. 11/562, 410 and 11/146,445 the entire contents of which are hereby incorporated by reference. As one example, there are three phase differences for the ultrasonic signals sent from the transmitters 201-203 of the ultrasonic wand 200 to the receivers 221-223 of the ultrasonic receiver 220. The phase difference is a time difference between a first received ultrasonic signal and a second received ultrasonic signal at the same transmitter with respect to a phase of the first received ultrasonic signal.

At step 310, the receiver 220 provides visual sensory feedback of the displacement and orientation. As one example, it sends the wand tip location and rotational matrices to the laptop 104 for rendering a virtual navigation device in the GUI 108. It can provide a visual indication in accordance with the wand location or movement, for example, if it exceeds a virtual or concentric boundary region, or an audible indication, such as an alarm sound. The sensory feedback can be based on an actual location or orientation of the wand. The orientation can trigger a response if the receiver 220 and wand 200 are not sufficiently line of sight, for example, if the face of the wand is angled more than 50 degrees from a face of the receiver. The sensory feedback can also be coupled with boundaries of a predetermined workflow, wherein moving the wand outside or within a predetermined location or zone of the workflow signals a sensory response. The sensory feedback can also report recognized patterns, if a preset number of points has been identified by the wand, a wand trace of an object or drawing matches a pre-stored pattern, an object rigidly attached to the wand achieves a predetermined orientation or displacement, or The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

In one embodiment, a system for sensory feedback control is herein provided comprising the receiver device 200 to generate a three-dimensional ultrasonic sensory space one centimeter or more beyond the receiver device 220 where the ultrasonic sensory space is wider than any size of the receiver device (see FIG. 1), generate a plurality of concentric boundary regions 227 (see FIG. 2) within the three-dimensional ultrasonic sensory space that are each associated with a sensory feedback response, and detect and report a location and position of the wand 200 in the three-dimensional ultrasonic sensing space from peak-detection of directed ultrasonic signals with high-resolution positional accuracy (see FIG. 3C), and an indicator (224, or GUI 108) communicatively coupled to the ultrasonic receiver device 220, the indicator providing a sensory feedback response associated with the location and position of the wand 200 in the three-dimensional ultrasonic sensory space upon crossing a concentric boundary region 227, wherein the sensory feedback response is visual, auditory, or haptic.

As shown in FIG. 2, the receiver device 200 includes a timer (228, or also processor 233), wherein the timer 228 identifies a time length the wand 200 is moving in the three-dimensional ultrasonic sensory space for resolving the high-resolution positional accuracy; and a user interface 237 communicatively coupled to the timer 227 for changing a behavior of the sensory feedback response in accordance with the time length that the wand object is moving. The receiver device 220 can recognize a stationarity of the wand 200 via position averaging, and the indicator 224 changes the sensory feedback response based on the stationarity that is recognized in a respective concentric boundary region 227. The receiver 220 can generate the ultrasonic sensing space to include the plurality of concentric boundary regions 227 each associated with at least one color indication, wherein the indicator 224 changes to a color representative of the location of the wand 200 when the wand 200 is within a corresponding concentric boundary region 227.

the system comprises

As previously discussed, the wand 200 includes an array of ultrasonic sensors 201-203 therein integrated on the wand, and an electronic circuit therein to drive the array of ultrasonic sensors to emit the directed ultrasonic signals within the three-dimensional space. The receive 220 estimates a time of flight between when the directed ultrasonic signals are transmitted from the wand and received at a plurality of ultrasonic microphones 221-223 on the receiver device by wave-front peak detection, calculates a differential receive time by peak differencing between the directed ultrasonic signal and a previously received directed ultrasonic signal for the plurality of ultrasonic microphones, and determines the position and relative displacement of the wand 200 from the time of flight measurements and the differential receive time measurements for the plurality of ultrasonic sensors from repeated operation.

In one arrangement, a sound map is created to define the concentric boundary regions. The receiver correlates the time of flight and phase differentials across the plurality of microphones 221-223 to both properties of acoustic sound propagation in air and also transmitting characteristics of the ultrasonic transmitters 201-203. This maps ultrasonic wave propagation characteristics of the ultrasonic transmitters to spherical attenuation of ultrasonic waves as a function of location and distance. For instance, as part of the calibration setup, the acoustic map is created by sweeping the wand through a range of incident angles (e.g., −180 to 180 degrees) in view of the receiver to map location and distance with phase differences. The sweep can cover a spherical surface with a changing radius to acquire two-dimensional and three-dimensional calibration data (e.g., phase corrections).

In a second embodiment, a method for sensory feedback control has been provided comprising the steps of generating a three-dimensional ultrasonic sensory space one centimeter or more above a receiver device 220 that is wider than any size of the receiver device, generating a plurality of concentric boundary regions 227 within the three-dimensional ultrasonic sensory space that are each associated with a sensory feedback response, monitoring a movement of the wand 200 in the three-dimensional ultrasonic sensing space from peak-detection of directed ultrasonic signals with high-resolution positional accuracy, reporting a position of the wand in the three-dimensional ultrasonic sensing space with high-resolution positional accuracy, and providing the position of the wand 200 with the sensory feedback in accordance with the movement, wherein the sensory feedback is visual, auditory, or haptic.

The method includes identifying a location of the wand when it is stationary in a concentric boundary region 227 of the three-dimensional ultrasonic sensory space, and adjusting a behavior of the sensory feedback based on the location. It also includes determining a length of time the wand is at a location, and adjusting a behavior of the sensory feedback based on the length of time. The receiver 200 can perform the method steps above to track the wand in the ultrasonic sensory space, and adjust sensory feedback in accordance with a location of the wand in the ultrasonic sensory space. As previously indicated the ultrasonic sensing space can projects 1 cm to 3 m beyond the touchless sensing unit for a predetermined resolution, and at greater ranges as a function of the spatial accuracy.

In a third embodiment, a method for providing sensory feedback during object control includes the steps of generating a three-dimensional ultrasonic sensory space one centimeter or more above a receiver device that is wider than any size of the receiver device, detecting a movement of a wand within the three-dimensional ultrasonic sensory space that is in direct communication with the receiver device, reporting a precise location of a tip of the wand in the three-dimensional ultrasonic sensing space with millimeter-resolution accuracy, and providing sensory feedback to a graphical user interface that reports a location of the wand tip and an orientation of the wand in three-dimensional space.

The method can include mapping ultrasonic wave propagation characteristics of the ultrasonic transmitters 201-203 to spherical attenuation of ultrasonic waves as a function of wand transmitter 201-203 location and distance. The time-of-flight and phase differentials across the microphone 221-223 receiver 220 array are correlated to the properties of the propagation of sound in the surrounding fluid (or air) and the transmitting characteristic of the ultrasonic transmitters (201-203; sound source) to precicesly determine the location of the sound source (and ultimately the wand 200 based on geometry of transmitter locations) relative to the microphone array (and ultimately the receiver 220 based on geometry of microphone locations).

No sensors are attached to the tip of the wand and the sensory feedback is visual, auditory, haptic or a combination thereof. The sensory feedback can be adjusted in accordance a location and position of the wand. The receiver 220 adjusts a sensory feedback to signify gaining control of the wand and adjusts the sensory feedback to signify relinquishing control of the wand. As one example, the GUI 108 shows when the wand 200 and receiver 200 are activated and the wand 200 is held within a boundary region to initiate touchless control. The receiver 200 can further recognize a movement of the wand, such as a wave gesture, and change the sensory feedback to identify the movement that is recognized.

These are but a few examples of embodiments and modifications that can be applied to the present disclosure without departing from the scope of the claims stated below. Accordingly, the reader is directed to the claims section for a fuller understanding of the breadth and scope of the present disclosure.

Where applicable, the present embodiments of the invention can be realized in hardware, software or a combination of hardware and software. Any kind of computer system or other apparatus adapted for carrying out the methods described herein are suitable. A typical combination of hardware and software can be a mobile communications device with a computer program that, when being loaded and executed, can control the mobile communications device such that it carries out the methods described herein. Portions of the present method and system may also be embedded in a computer program product, which comprises all the features enabling the implementation of the methods described herein and which when loaded in a computer system, is able to carry out these methods.

While the preferred embodiments of the invention have been illustrated and described, it will be clear that the embodiments of the invention are not so limited. Numerous modifications, changes, variations, substitutions and equivalents will occur to those skilled in the art without departing from the spirit and scope of the present embodiments of the invention as defined by the appended claims.

What is claimed, is:

1. A system for sensory feedback control, comprising:
   an ultrasonic receiver device to:
   generate a three-dimensional ultrasonic sensory space one centimeter or more beyond the receiver device and the ultrasonic sensory space is wider than any size of the receiver device,
   defining a plurality of concentric boundary regions within the three-dimensional ultrasonic sensory space that are each associated with a wand location and a sensory feedback response, and
   detect and report the location and position of the wand in the three-dimensional ultrasonic sensing space from peak-detection of directed ultrasonic signals with high-resolution positional accuracy; and
   an indicator communicatively coupled to the ultrasonic receiver device, the indicator providing a sensory feedback response associated with the location and position of the wand in the three-dimensional ultrasonic sensory space,
   wherein the sensory feedback response is visual, auditory, or haptic.

2. The system of claim 1, wherein the receiver device further comprises:
   a timer, wherein the timer identifies a time length the wand is moving in the three-dimensional ultrasonic sensory space for resolving the high-resolution positional accuracy; and
   a user interface communicatively coupled to the timer for changing a behavior of the sensory feedback response in accordance with the time length that the wand is moving.

3. The system of claim 2, wherein the receiver device recognizes a stationarity of the wand via position averaging, and the indicator changes the sensory feedback response based on the stationarity that is recognized in a respective concentric boundary region.

4. The system of claim 1, wherein the receiver device generates the ultrasonic sensing space to include the plurality of concentric boundary regions each associated with at least one color indication, wherein the indicator changes to a color representative of the location of the wand when the wand is within a corresponding concentric boundary region.

5. The system of claim 1, wherein the indicator is at least one of a light emitting diode, a monitor, a user interface, a light contrast display (LCD), an array of illuminating elements, a laser, or a vibration element.

6. The system of claim 1, wherein the system comprises an array of ultrasonic transmitters integrated on the wand; and
   an electronic circuit on the wand to drive said array of ultrasonic transmitters to emit the directed ultrasonic signals within the three-dimensional space,
   where the receiver device:
   estimates a time of flight between when said directed ultrasonic signals are transmitted from the wand and received at a plurality of ultrasonic microphones on the receiver device by wave-front peak detection;
   calculates phase differentials by peak differencing between the directed ultrasonic signal and a previously received directed ultrasonic signal for the plurality of ultrasonic microphones; and
   determines the position and relative displacement of said wand from said time of flight measurements and said phase differentials for the plurality of ultrasonic sensors from repeated operation.

7. The system of claim 6, wherein the receiver correlates the time of flight and phase differentials across the plurality of microphones to both properties of acoustic sound propagation in air and also transmitting characteristics of the ultrasonic transmitters.

8. The system of claim 6, where the step of defining the concentric boundary regions maps ultrasonic wave propagation characteristics of the ultrasonic transmitters to spherical attenuation of ultrasonic waves as a function of location and distance.

9. A method for sensory feedback control, the method comprising the steps of:

generating a three-dimensional ultrasonic sensory space one centimeter or more above a receiver device that is wider than any size of the receiver device, generating a plurality of concentric boundary regions within the three-dimensional ultrasonic sensory space that are each associated with a sensory feedback response;

monitoring a movement of a wand in the three-dimensional ultrasonic sensing space from peak-detection of directed ultrasonic signals with high-resolution positional accuracy;

reporting a position of the wand in the three-dimensional ultrasonic sensing space with high-resolution positional accuracy; and providing the position of the wand with the sensory feedback in accordance with the movement, wherein the sensory feedback is visual, auditory, or haptic.

10. The method of claim 9, further comprising:

identifying a location of the wand when it is stationary in a concentric boundary region of the three-dimensional ultrasonic sensory space; and adjusting a behavior of the sensory feedback based on the location.

11. The method of claim 9, further comprising determining a length of time the wand is at a location; and adjusting a behavior of the sensory feedback based on the length of time.

12. The method of claim 9, further comprising:

tracking the wand in the ultrasonic sensory space; and adjusting sensory feedback in accordance with a location of the wand in the ultrasonic sensory space, wherein the ultrasonic sensing space projects 1 cm to 3 m beyond the touchless sensing unit.

13. The method of claim 9, further comprising:

creating an acoustic map of acoustic propagation characteristics of ultrasonic wand transmitters at a plurality of locations in physical space in proximity to an ultrasonic receiver monitoring the movement of the wand.

14. The method of claim 9, further comprising:

correlating time of flight and phase differentials to both properties of sound propagation in surrounding air and also to transmit characteristics of ultrasonic wand transmitters to precisely determine a location of the wand relative to an ultrasonic receiver monitoring the movement of the wand.

15. A method for providing sensory feedback control, the method comprising the steps of:

generating a three-dimensional ultrasonic sensory space one centimeter or more above a receiver device that is wider than any size of the receiver device;

detecting a movement of a wand within the three-dimensional ultrasonic sensory space that is in direct communication with the receiver device;

reporting a precise location of a tip of the wand in the three-dimensional ultrasonic sensing space with millimeter-resolution accuracy; and providing sensory feedback to a graphical user interface that reports a location of the wand tip and an orientation of the wand in three-dimensional space, wherein no sensors are attached to the tip of the wand and the sensory feedback is visual, auditory, or haptic.

16. The method of claim 15, further comprising adjusting the sensory feedback in accordance a location and position of the wand.

17. The method of claim 15, further comprising mapping ultrasonic wave propagation characteristics of the ultrasonic transmitters to spherical attenuation of ultrasonic waves as a function of wand transmitter location and distance.

18. The method of claim 17, further comprising recognizing a movement of the wand, and changing the sensory feedback to identify the movement that is recognized.

19. The method of claim 15, further comprising correlating time of flight and phase differentials to both properties of sound propagation in surrounding air and also to transmit characteristics of ultrasonic wand transmitters to precisely determine a location of the wand relative to an ultrasonic receiver monitoring the movement of the wand.

20. The method of claim 15, wherein providing sensory feedback further comprises:

adjusting a sensory feedback to signify gaining control of the wand; and adjusting the sensory feedback to signify relinquishing control of the wand.

\* \* \* \* \*